US012699387B2

(12) United States Patent
Dey et al.

(10) Patent No.: US 12,699,387 B2
(45) Date of Patent: Aug. 4, 2026

(54) REINFORCEMENT LEARNING (RL) BASED FEDERATED AUTOMATED DEFECT CLASSIFICATION AND DETECTION

(71) Applicants: IMEC VZW, Leuven (BE); Katholieke Universiteit Leuven, Leuven (BE)

(72) Inventors: Bappaditya Dey, Heverlee (BE); Enrique Dehaerne, Leuven (BE); Sandip Halder, Bierbeek (BE)

(73) Assignees: Imec vzw, Leuven (BE); Katholieke Universiteit Leuven, Leuven (BE)

( * ) Notice: Subject to any disclaimer, the term of this patent is extended or adjusted under 35 U.S.C. 154(b) by 360 days.

(21) Appl. No.: 18/462,181

(22) Filed: Sep. 6, 2023

(65) Prior Publication Data

US 2025/0076866 A1      Mar. 6, 2025

(51) Int. Cl.
*G05B 23/02*          (2006.01)
*G05B 19/18*          (2006.01)
(52) U.S. Cl.
CPC ....... *G05B 23/0245* (2013.01); *G05B 19/188* (2013.01); *G05B 2219/45031* (2013.01); *G05B 2223/02* (2018.08)
(58) Field of Classification Search
CPC ........ G05B 19/188; G05B 2219/45031; G05B 2223/02; G05B 23/0245; G06T 2207/10061; G06T 2207/20081; G06T 2207/20084; G06T 2207/30148; G06T 7/0004; G06T 7/00; G06T 5/00; G06T 3/00; G06T 2219/00; G06T 2215/00
See application file for complete search history.

(56) References Cited

U.S. PATENT DOCUMENTS

| | | | |
|---|---|---|---|
| 8,775,101 B2 | 7/2014 | Huang et al. | |
| 10,713,769 B2 | 7/2020 | Zhang et al. | |
| 2013/0064442 A1* | 3/2013 | Chang | G06T 7/001 |
| | | | 382/149 |
| 2015/0100530 A1* | 4/2015 | Mnih | A63F 13/67 |
| | | | 706/25 |
| 2019/0073568 A1 | 3/2019 | He et al. | |
| 2020/0027021 A1 | 1/2020 | Sastry et al. | |
| 2020/0083080 A1 | 3/2020 | Clark et al. | |

(Continued)

OTHER PUBLICATIONS

Kim et al., Deep Learning Based Automatic Defect Classification in Through-Silicon via Process, 2018, Samsung Electronics Yong-In, South Korea, p. 35-39 (Year: 2018).*

(Continued)

*Primary Examiner* — Kidest Worku
(74) *Attorney, Agent, or Firm* — McDonnell Boehnen Hulbert & Berghoff LLP

(57) ABSTRACT

A method for training a local machine learning model is provided. The method includes receiving a scanning electron microscope (SEM) image of semiconductor features. The method additionally includes determining a location and dimensions of a bounding box within the SEM image. The method yet further includes determining, whether a defect feature exists within the bounding box, based on an unsupervised object detection process. The method also includes, if the defect feature exists within the bounding box, receiving positive rewards. The method also includes, if the defect feature does not exist within the bounding box, receiving negative rewards.

19 Claims, 14 Drawing Sheets

(56)                    References Cited

U.S. PATENT DOCUMENTS

| | | | |
|---|---|---|---|
| 2022/0270269 A1* | 8/2022 | Pattison | ................. G06T 7/248 |
| 2023/0076185 A1 | 3/2023 | Larranaga et al. | |
| 2023/0136110 A1 | 5/2023 | Theagarajan et al. | |
| 2023/0343078 A1 | 10/2023 | Dey et al. | |
| 2024/0411296 A1 | 12/2024 | Korb et al. | |

OTHER PUBLICATIONS

Dey et al., Deep Learning-Based Defect Classification and Detection in SEM Images, Jun. 2022, cThe Center for Advanced Computer Studies, University of Louisiana at Lafayette, Louisiana, USA,et al., p. 1-22. (Year: 2022).*
Dey et al., SEM image denoising with Unsupervised Machine Learning for better defect inspection and metrology, 2021,aimec, Kapeldreef 75, 3001 Leuven, Belgium, et al., p. 1-1 (Year: 2021).*
Cleland et al., Bounding Box Improvement With Reinforcement Learning, 2018, Thesis Committee: Melanie Mitchell, Chair Bart Massey Wu-Chang Feng, p. 1-54 (Year: 2018).*
Enrique Dehaerne et. al., "Ensemble Deep Learning-based Defect Classification and Detection in SEM Images", LearnOpenCV, Jan. 17, 2022 (https://learnopencv.com/ensemble-deep-learning-based-defect-classification-and-detection-in-sem-images/).
Enrique Dehaerne et. al., "A Comparative Study of Deep-Learning Object Detectors for Semiconductor Defect Detection", 2022 29th IEEE International Conference on Electronics, Circuits and Systems (ICECS), Glasgow, United Kingdom, 2022, doi: 10.1109/ICECS202256217.2022.9971022.
Bappaditya Dey et. al., "Towards improving challenging stochastic defect detection in SEM images based on improved YOLOv5", Proc. SPIE 12293, Photomask Technology 2022, 1229305 (Dec. 1, 2022); doi: 10.1117/12.2645402.
Bappaditya Dey et al., "Deep Learning based Defect classification and detection in SEM images: A Mask R-CNN approach", arXiv:2211.02185, Nov. 3, 2022.
Dhruv V. Patel et al., "Deep learning-based detection, classification, and localization of defects in semiconductor processes", J. Micro/Nanolith. MEMS MOEMS 19(2) 024801 (Apr. 20, 2020) https://doi.org/10.1117/1.JMM.19.2.024801.
Juan C. Caicedo et. al., "Active Object Localization with Deep Reinforcement Learning", Proceedings of the IEEE International Conference on Computer Vision (ICCV), 2015, pp. 2488-2496.
Enrique Dehaerne et. al., "Benchmarking Feature Extractors for Reinforcement Learning-Based Semiconductor Defect Localization", 2023 International Symposium ELMAR, Zadar, Croatia, 2023, pp. 49-53, https://doi.org/10.48550/arXiv.2311.11145.

* cited by examiner

100
Figure 1

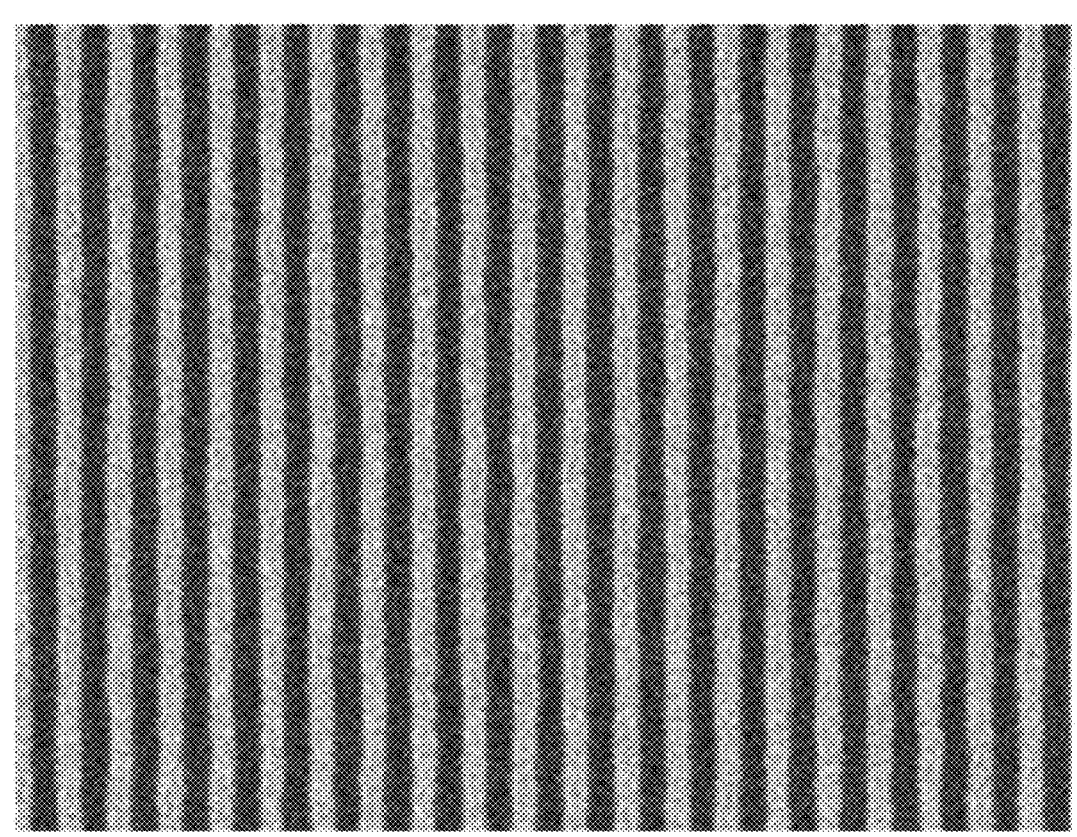
Figure 2

320

330

340

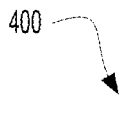

400

Central Model Server 410

Initial Trained ML Model
414

Updated Global ML
Model 416

Local SEM
Image Data 412

Averaging / Consensus 480

Client A 420

Client A SEM
Image Data
422

Client A Local Model
424

Client A Trained Weight
Parameters 426

Client B 430

Client B SEM
Image Data
432

Client B Local Model
434

Client B Trained Weight
Parameters 436

Client C 440

Client C SEM
Image Data
442

Client C Local Model
444

Client C Trained Weight
Parameters 446

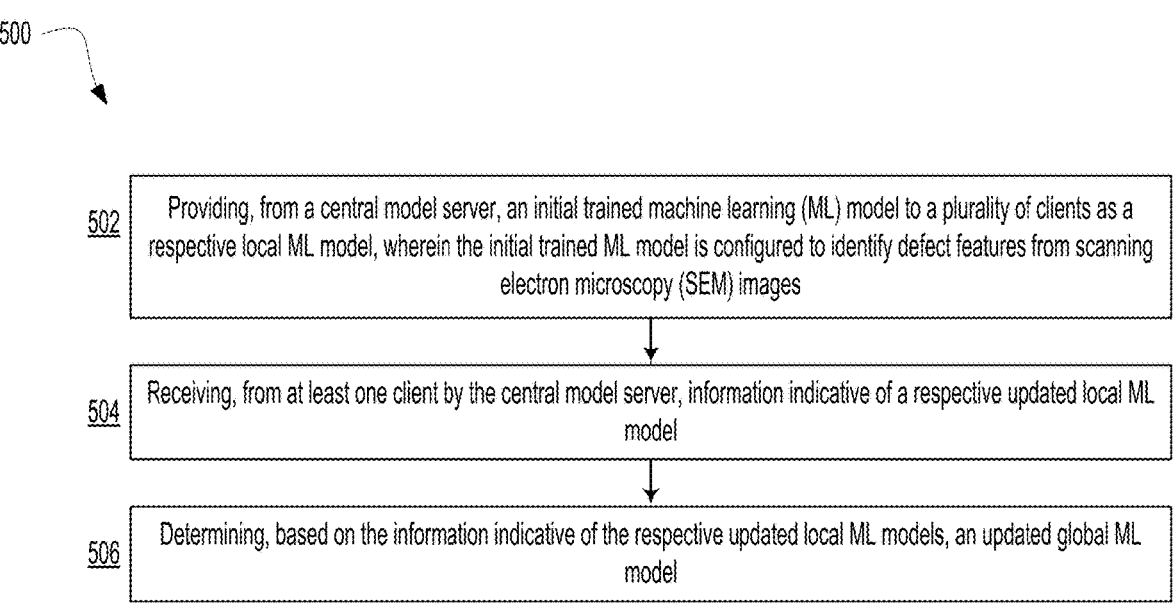

500

| 502 | Providing, from a central model server, an initial trained machine learning (ML) model to a plurality of clients as a respective local ML model, wherein the initial trained ML model is configured to identify defect features from scanning electron microscopy (SEM) images |
| 504 | Receiving, from at least one client by the central model server, information indicative of a respective updated local ML model |
| 506 | Determining, based on the information indicative of the respective updated local ML models, an updated global ML model |

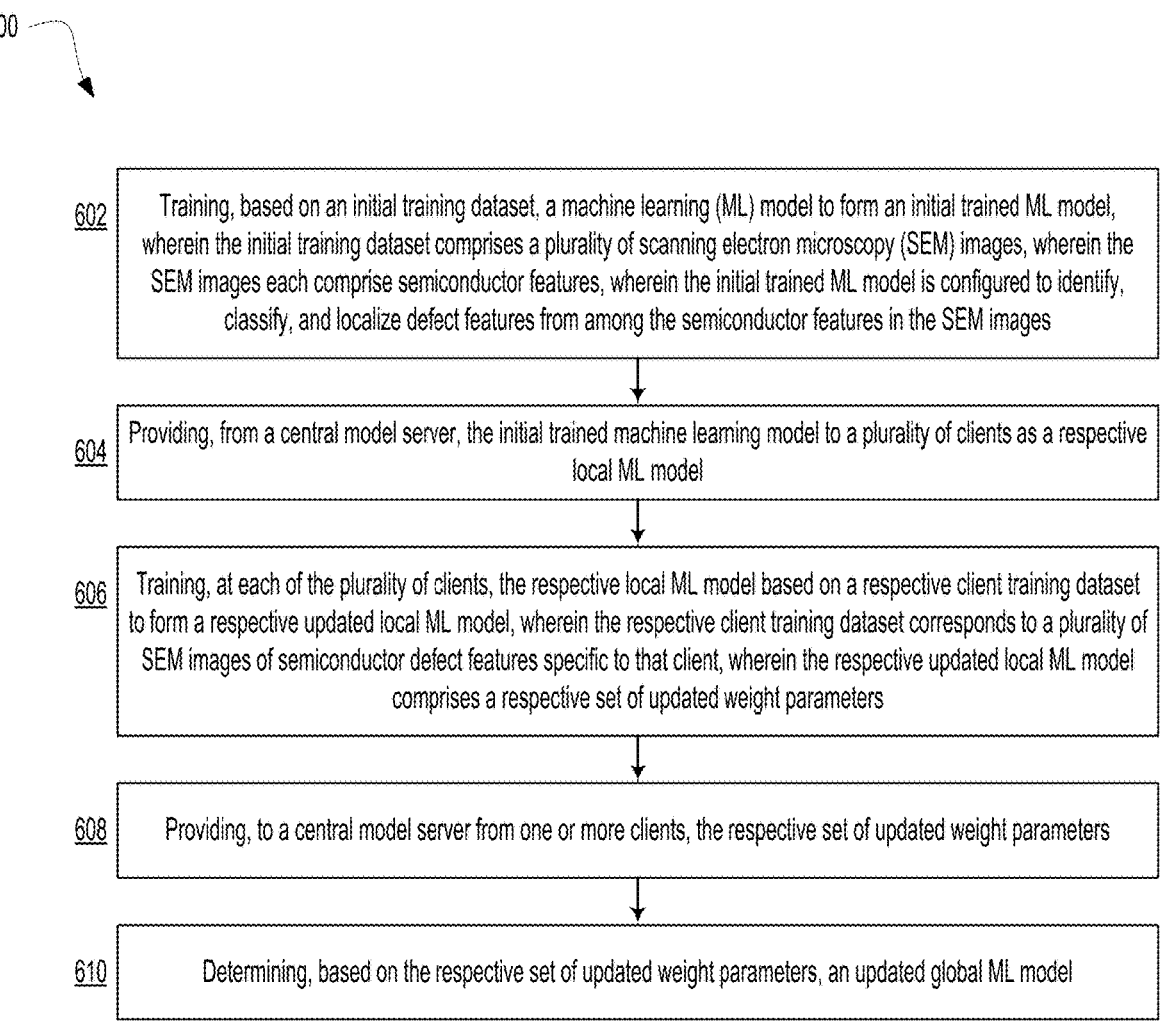

602  Training, based on an initial training dataset, a machine learning (ML) model to form an initial trained ML model, wherein the initial training dataset comprises a plurality of scanning electron microscopy (SEM) images, wherein the SEM images each comprise semiconductor features, wherein the initial trained ML model is configured to identify, classify, and localize defect features from among the semiconductor features in the SEM images 604  Providing, from a central model server, the initial trained machine learning model to a plurality of clients as a respective local ML model 606  Training, at each of the plurality of clients, the respective local ML model based on a respective client training dataset to form a respective updated local ML model, wherein the respective client training dataset corresponds to a plurality of SEM images of semiconductor defect features specific to that client, wherein the respective updated local ML model comprises a respective set of updated weight parameters 608  Providing, to a central model server from one or more clients, the respective set of updated weight parameters 610  Determining, based on the respective set of updated weight parameters, an updated global ML model

Figure 6

700

| 702 | Receiving a scanning electron microscope (SEM) image of a plurality of semiconductor features |

| 704 | Applying a trained global machine learning (ML) model to determine whether a defect feature exists within the SEM image, wherein the trained global ML model was trained based on incorporating a plurality of adjusted parameter weights from a respective plurality of local ML models operating on a respective client devices based on a consensus/ voting process and without receiving local training data from the client devices |

Figure 7

900

902

Training a local machine learning (ML) model, wherein the training comprises:
receiving a scanning electron microscope (SEM) image of semiconductor features;
determining a location and dimensions of a bounding box within the SEM image;
determining, whether a defect feature exists within the bounding box, based on an unsupervised object detection process;
if the defect feature exists within the bounding box, receiving positive rewards; and
if the defect feature does not exist within the bounding box, receiving negative rewards

Figure 9

REINFORCEMENT LEARNING (RL) BASED FEDERATED AUTOMATED DEFECT CLASSIFICATION AND DETECTION

FIELD OF THE DISCLOSURE

The present description relates to the field of semiconductor inspection processes. More specifically it relates to ways to identify and localize processing and stochastic defects at various stages of semiconductor device fabrication.

BACKGROUND

Scanning electron microscopy (SEM) is a powerful tool for inspecting semiconductor processing steps. SEM can be used to image features as small as a few nanometers, making it ideal for detecting defects in the deep sub-micron-scale structures of semiconductor devices. Defects could include, for example, missing or incomplete features, defects in the shape or size of features, particles or contaminants, resist delamination, cracks, and/or voids. By identifying defects early on in manufacturing, costly failures may be prevented later on in the process and/or ensure higher reliability devices.

Conventional semiconductor chips are usually made with various multi-patterning lithography (e.g., 193i=193 nm wavelength and immersion lens) steps or extreme ultraviolet (EUV) lithography (e.g., 13.5 nm wavelength). The final device dimensions in such devices are often below 40 nm. Scaling of the devices has occurred continuously over the last few decades while keeping Moore's law valid as critical dimension nodes have become ever smaller. To bring a particular technology node to yield, extensive inspection and metrology runs are typically needed. To make a semiconductor device, hundreds of process steps need to be done and need to yield more than 99.999%. During the yield ramp, every layer is scrutinized as best as possible to weed out any yield detractors. Defect detection and analysis need to be as accurate as possible. While inspection of these extremely small structures is still possible with conventional optical tools, they still need SEM image verification and classification, as illustrated in FIG. 1. It is not possible to perform proper metrology on some individual devices without electron beam (e-beam)-based tools. For example, SEM images could be used in the critical dimension SEM (CD SEM) process to determine critical dimension uniformity (CDU) and edge placement error (EPE) for optimizing proper optical proximity correction (OPC) and to provide a lithography manufacturability check (LMC). SEM images could also be utilized alongside optical inspection to verify process window qualification (PWQ) and defect identification. Yet further, SEM images could be used in the review SEM process to verify and classify defects. While e-beams provide the required resolution to look into these small structures, they suffer from inherent noise, and this makes it even more difficult for correct, repeatable and accurate measurements.

Current state-of-the-art defect detection tools (optical/e-beam) have certain limitations as these tools are driven by some rule-based techniques for defect classification and detection. These limitations often lead to misclassification of defects, which leads to increased engineering time to correctly classify different defect patterns. Accordingly, there is a need for faster, less process dependent, and more reliable SEM inspection methods.

SUMMARY

The present embodiments relate to a federated, reinforcement-learning (RL) machine learning system for automatic defect detection and classification and methods for its use.

In a first aspect, a federated machine learning method is presented. The federated machine learning method includes providing, from a central model server, an initial trained machine learning (ML) model to a plurality of clients as a respective local ML model. The initial trained ML model is configured to identify defect features from scanning electron microscopy (SEM) images. The federated machine learning method also includes receiving, from at least one client by the central model server, information indicative of a respective updated local ML model. The federated machine learning method additionally includes determining, based on the information indicative of the respective updated local ML models, an updated global ML model.

In a second aspect, a federated machine learning method is presented. The federated machine learning method includes training, based on an initial training dataset, a machine learning (ML) model to form an initial trained ML model. The initial training dataset includes a plurality of scanning electron microscopy (SEM) images. The SEM images each include semiconductor features. The initial trained ML model is configured to identify, classify, and localize defect features from among the semiconductor features in the SEM images. The federated machine learning method also includes providing, from a central model server, the initial trained machine learning model to a plurality of clients as a respective local ML model. Yet further, the federated machine learning method includes training, at each of the plurality of clients, the respective local ML model based on a respective client training dataset to form a respective updated local ML model. The respective client training dataset corresponds to a plurality of SEM images of semiconductor defect features specific to that client. The respective updated local ML model includes a respective set of updated weight parameters. The federated machine learning method also includes providing, to a central model server from one or more clients, the respective set of updated weight parameters. The federated machine learning method additionally includes determining, based on the respective set of updated weight parameters, an updated global ML model.

In a third aspect, a method is provided. The method includes receiving a scanning electron microscope (SEM) image of a plurality of semiconductor features. The method also includes applying a trained global machine learning (ML) model to determine whether a defect feature exists within the SEM image. The trained global ML model was trained based on incorporating a plurality of adjusted parameter weights from a respective plurality of local ML models operating on a respective client devices based on a consensus/voting process and without receiving local training data from the client devices.

In a fourth aspect, a method is provided. The method includes training a local machine learning (ML) model. The training includes receiving a scanning electron microscope (SEM) image of semiconductor features. The training also includes determining a location and dimensions of a bounding box within the SEM image. The training also includes determining, whether a defect feature exists within the bounding box, based on an unsupervised object detection process. The training yet further includes, if the defect feature exists within the bounding box, receiving positive rewards. The training additionally includes, if the defect feature does not exist within the bounding box, receiving negative rewards.

Particular aspects of the embodiments are set out in the accompanying independent and dependent claims. Features from the dependent claims may be combined with features of the independent claims and with features of other dependent claims as appropriate and not merely as explicitly set out in the claims.

These and other aspects will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

FIG. 1 is an illustration of the defect inspection and review space.

FIG. 2 is an illustration of a line-space pattern.

FIG. 4B is an illustration of a federated ADC framework, in accordance with an example embodiment.

FIG. 5 is a federated machine learning method, in accordance with an example embodiment.

FIG. 6 is a method, in accordance with an example embodiment.

FIG. 7 is a method, in accordance with an example embodiment.

FIG. 9 is a method, in accordance with an example embodiment.

Figure 3A:
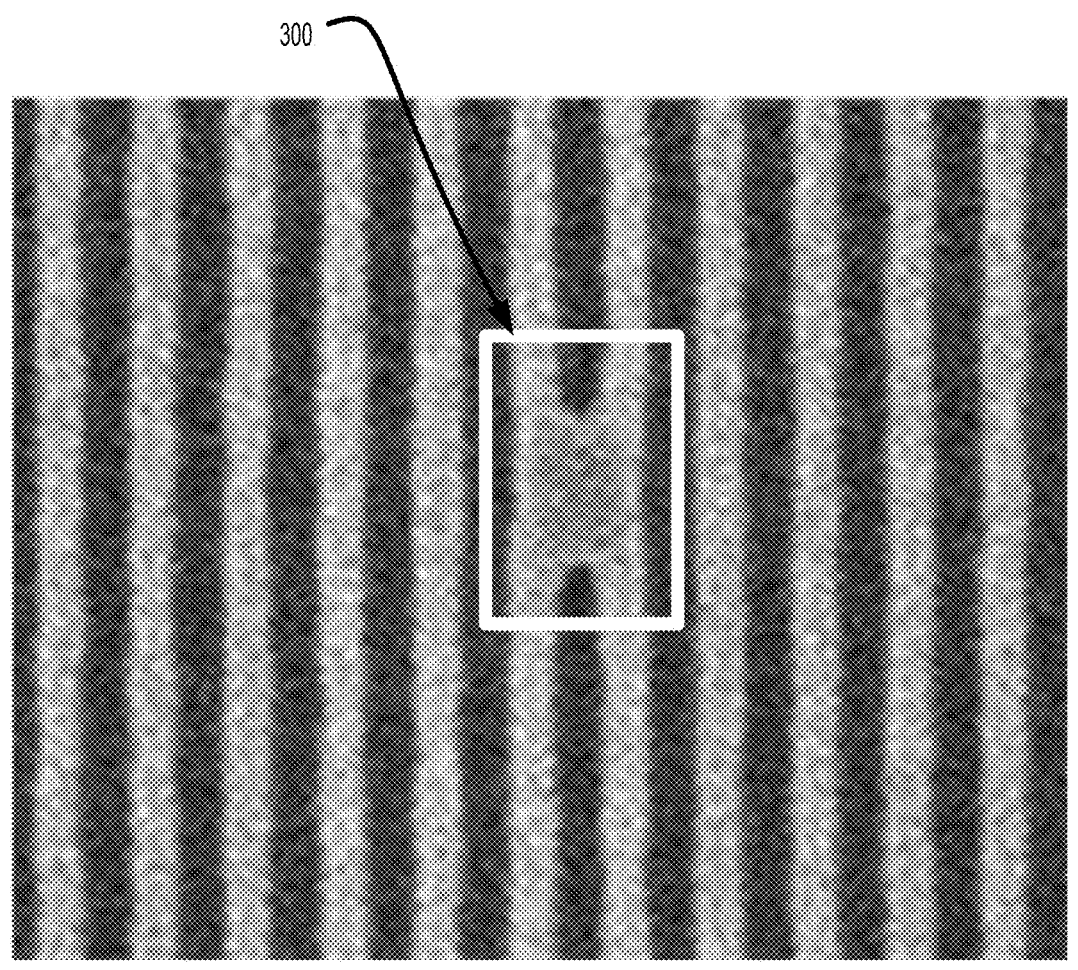
FIG. 3A is an illustration of a bridge defect.

In the different drawings, the same reference signs refer to the same or analogous elements.

All the figures are schematic, not necessarily to scale, and generally only show parts which are necessary to elucidate example embodiments, wherein other parts may be omitted or merely suggested.

Any reference signs in the claims shall not be construed as limiting the scope.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The drawings described are only schematic and are non-limiting. In the drawings, the size of some of the elements may be exaggerated and not drawn on scale for illustrative purposes. The dimensions and the relative dimensions do not correspond to actual reductions to practice of the embodiments.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present embodiments, the only relevant components of the device are A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed embodiments requires more features than are expressly recited in each claim. Rather, as the following claims reflect, aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

FIG. 1 is an illustration of the defect inspection and review space 100. As described herein, electron beam (e-beam) inspection can be utilized in several different use cases. For example, e-beam inspection can be used in conjunction with CD-SEM, optical inspection, and review SEM applications.

FIG. 2 is an illustration of a line-space pattern 200. FIG. 2 shows an example of what a series of lines patterned by an EUV tool (ASML 3400 series scanner) looks like when viewed through a scanning electron microscope (SEM). In some embodiments, the line-space features could include the following line: space dimensions: 50:50 nm, 100:100 nm, 250:250 nm, 500:500 nm, 1000:1000 nm, or 2000:2000 nm. It will be understood that other line:space dimensions are possible and contemplated. Furthermore, it will be understood that the ratio of line to space dimension need not be 1:1. Rather, other line:space ratios are contemplated and possible.

Although semiconductor patterning processes are tightly controlled, problems may still arise in the patterning process. Such issues may cause defects, which are ideally detected early on and fixed to prevent yield issues and avoid disastrous consequences on the final device. SEM images are a primary medium with which to identify a region-of-interest with a potential defect or identify specific defect locations. In various applications, SEM images can be utilized to help classify defect types: bridge, line collapse, gap/breaks, etc. SEM images can also be used to classify other, more challenging defect types, such as micro-bridges and micro-gaps. Yet further, SEM images can be utilized to detect and localize each distinct defect of interest.

Within the scope of the present disclosure, it will be understood that defects could include any type of imperfections in the desired physical structure of a partially- or fully-fabricated semiconductor device. Such imperfections could arise in lithography features (e.g., developed photo-resist structures), metal, etched semiconductor or oxide structures, among other possibilities. Furthermore, it will be understood that while some defects could be caused by fabrication issues that occur during the manufacturing process, other types of defects could include stochastic defects, which occur randomly. Stochastic defects may change from run to run, process to process, and node to node. Stochastic defects are a particular challenge in EUV lithography, which uses light with a wavelength of 13.6 nanometers. Such wavelengths can make it more difficult to control the exposure of the photoresist, which can lead to stochastic defects.

FIGS. 3A-3D illustrate various defect types, which are referenced elsewhere in this disclosure.

FIG. 3A is an illustration of a bridge defect 300. As an example, bridge defect 300 could include a small connection between two adjacent lines in a photoresist pattern. This can happen when the exposure dose is too high or when the development process is not optimized. Bridge defects can cause short circuits or other problems in the final device. Additionally or alternatively, if the development process is not optimized, the photoresist may not be completely removed from the areas between the lines.

Figure 3B:
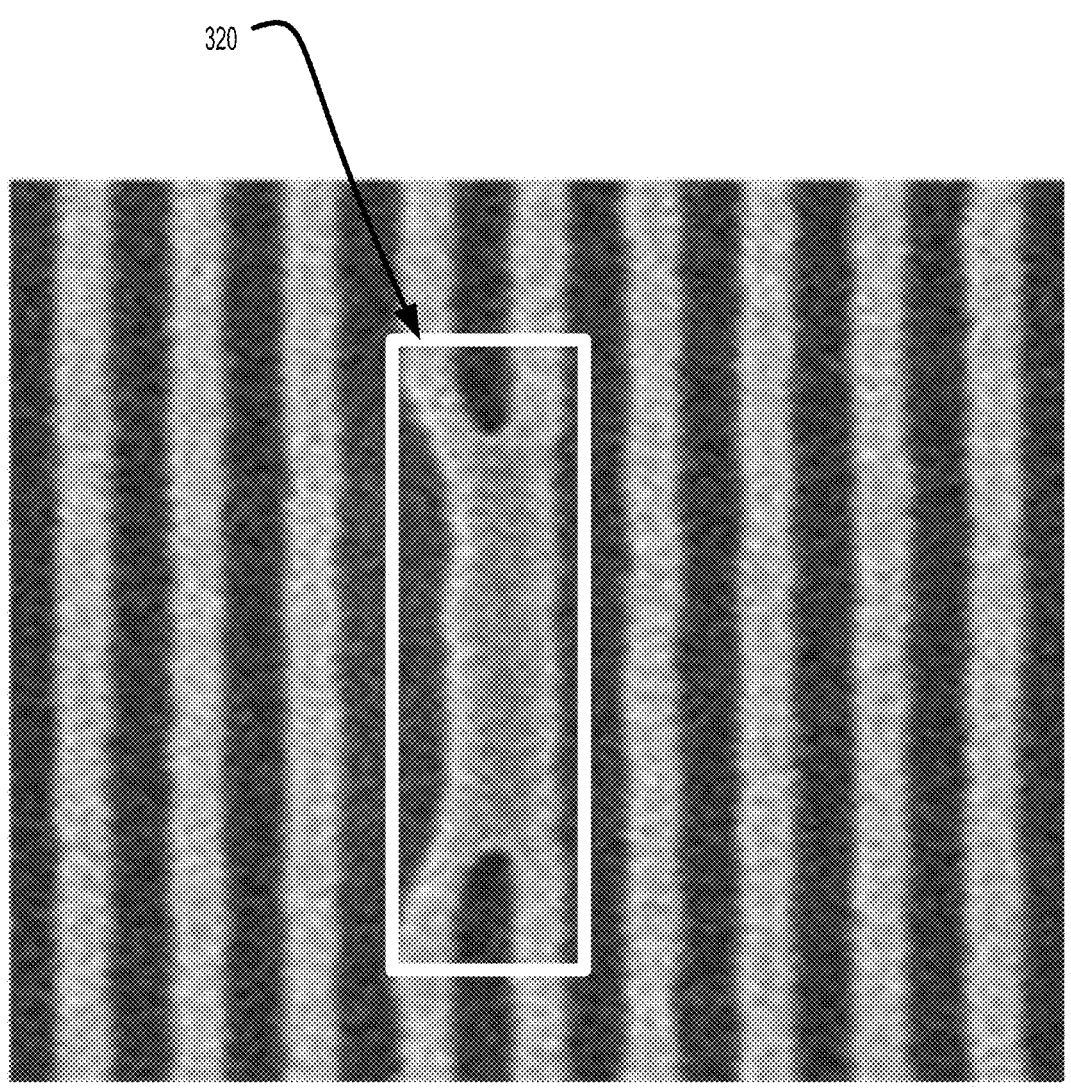
FIG. 3B is an illustration of a line collapse defect.

FIG. 3B is an illustration of a line collapse defect 320. In some embodiments, line collapse defect 320 could include a type of defect in semiconductor fabrication that occurs when a line of material, such as a metal or semiconductor, collapses into a smaller area. Such line collapse defects may occur due to insufficient film thickness. In such scenarios, an insufficiently thick resist thickness may not be strong enough to resist the forces that are acting on it, and it may collapse. Other factors such as high temperatures, chemical etching, and/or mechanical stresses can cause line collapse defects.

Figure 3C:
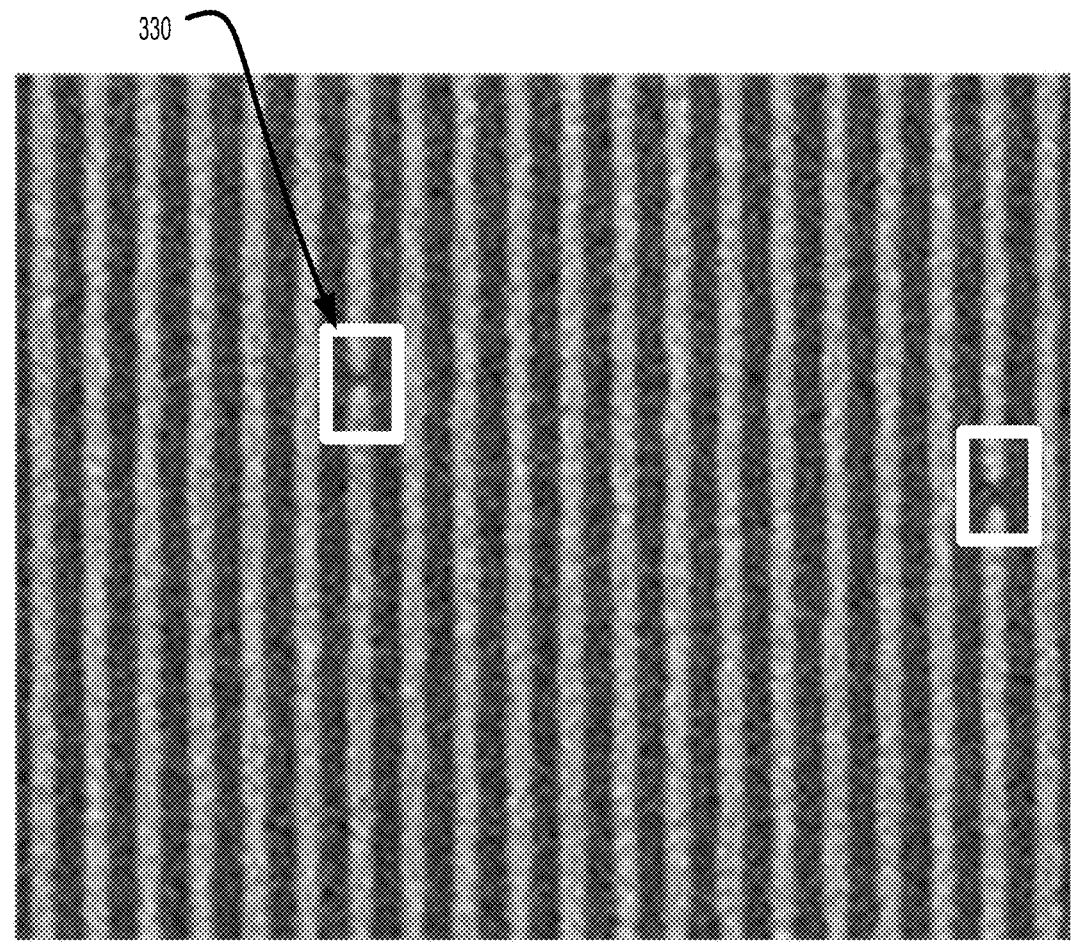
FIG. 3C is an illustration of a gap/break defect.

FIG. 3C is an illustration of a gap/break defect 330. In various examples, a gap/break defect 330 could include a missing or discontinuous region in a semiconductor film. This can occur during any step of the fabrication process, including deposition, lithography, etching, and annealing. For example, gap/break defects may occur due to particle contamination, poor film uniformity, mask defects, etching errors, and/or annealing errors.

Figure 3D:
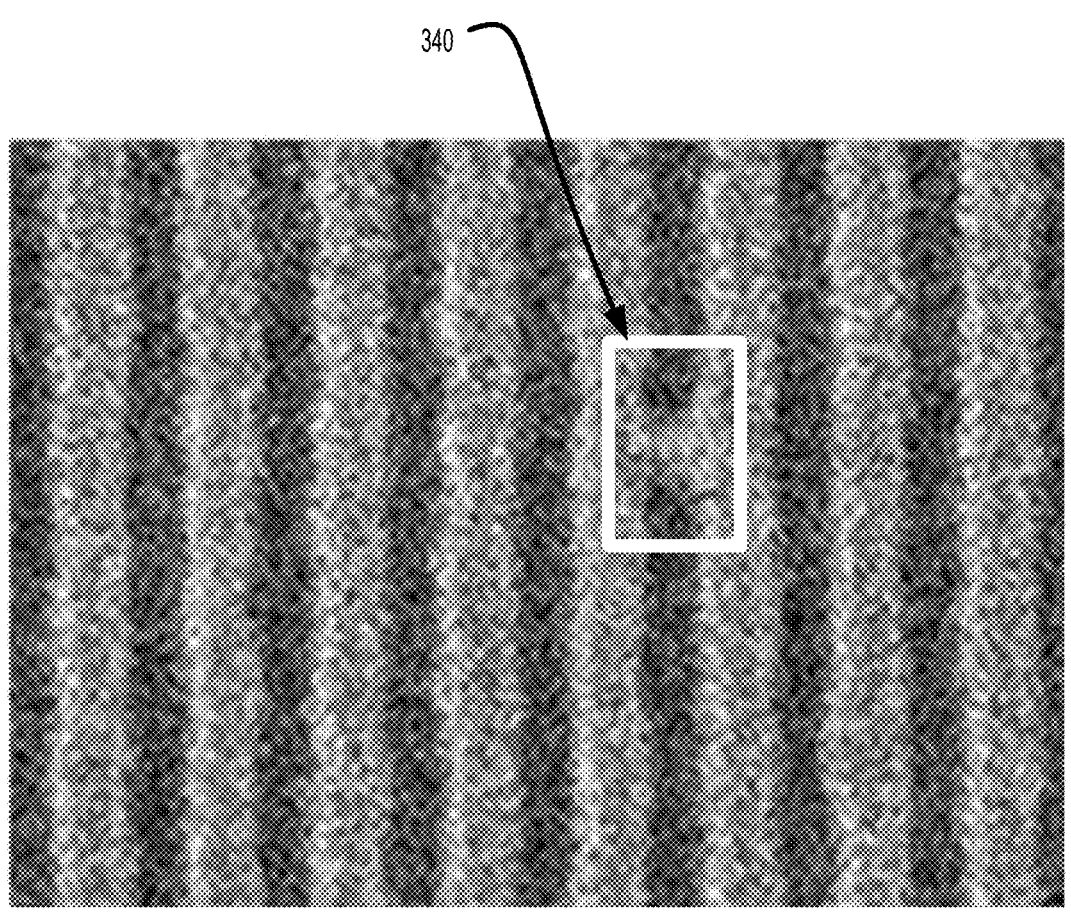
FIG. 3D is an illustration of a micro-bridge defect.

FIG. 3D is an illustration of a micro-bridge defect 340. In various embodiments, micro-bridge defects may include small, unwanted micron-size or smaller connections between two adjacent features in a semiconductor device.

Detecting these different types of defects and localizing them within an SEM image can be a very challenging problem because these defect patterns are in micron/nanometer-scale range and may have variable degrees of pixel-wide defect level. Early detection of these defects can help reduce engineering time as well as tool cycle time associated with the defect inspection process. Once defects are correctly detected, different parameters (area, length, width, additional feature vectors, etc.) of the defects can be output for better classification and understanding the root cause of the defects.

In various examples, the SEM images could be captured using several different SEM imaging modes. For example, the SEM images could be obtained using secondary electron imaging (SEI). In such scenarios, SEI images are created by detecting the secondary electrons produced when a surface interacts with the electron beam. Additionally or alternatively, the SEM images could be obtained using backscattered electron imaging (BEI). BEI utilizes backscattered electrons, which are scattered back from the sample by Coulombic forces. In some embodiments, BEI images may be sensitive to compositional differences in sample materials. Yet further, STM images could be obtained using scanning transmission electron microscopy (STEM), which use an electron beam in transmission through a thin sample.

Furthermore, although example embodiments describe the utilization of SEM images to identify potential defects, it will be understood that other types of images are possible and contemplated. For example, frameworks and methods described herein could be applied to optical images. In various embodiments, the optical images may be obtained from: bright field microscopy, dark field microscopy, phase contrast microscopy, fluorescence microscopy, confocal microscopy, among other possibilities. It will be understood that these types of optical images may all be utilized within the scope of the present disclosure.

Yet further, images formed using other types of microscopes are possible and contemplated. For example, images from scanning probe microscopes, such as those from helium ion microscopes, could be used to identify potential defects within the scope of this application.

Different foundries, resist material suppliers, tool vendors, and users experience very different defect types and patterns. Accordingly, learning about all of the different variations of defect types and patterns may be useful for semiconductor fabrication as a whole. Specifically, for an industry-wide deployable automated defect classification and detection (ADCD) framework, more data may generally lead to better defect detection accuracy from a machine learning model. However, storing data from these different parties at a central server/storage unit may lead to a violation of client confidentiality and also poses a risk of releasing other private data and/or trade secrets.

In machine learning, an ensemble model is a group of models that are trained together to improve the performance of the overall model. The models in an ensemble model are typically trained on different data sets or with different parameters. This helps to reduce the variance of the overall model and improve its accuracy. In some embodiments, an ensemble model may utilize bagging. Bagging is a method of creating an ensemble model by training multiple copies of the same model on different data sets. Additionally or alternatively, the ensemble model may utilize boosting, which is a method of creating an ensemble model by training multiple models sequentially. Each model is trained to correct the errors of the previous models. Furthermore, in some examples, stacking is a method of creating an ensemble model by training a meta-model to combine the predictions of multiple base models. Within the scope of the present disclosure, an ensemble model that utilizes the benefits of bagging, boosting, and stacking may help reduce the variance of the overall global model and improve its accuracy over many different types of semiconductor device fabrication defects, without violating data privacy for parties (e.g., photoresist vendors, semiconductor foundries, end users, researchers, etc.) that contribute information about their respective improved defect models.

This is a main purpose of training a global model and updating the learned weight parameters with a gradually universal dataset. Such a global model training method is beneficial for all parties involved in the federated machine learning structure.

For example, if a local model is trained with only one defect type (e.g., line-space bridge defects) or only one geometrical pattern (e.g., line-space arrays), the model can only be reliably used for identifying and localizing line-space bridge defects.

However, if a client trained a respective model locally on contact-hole defect patterns and both exchanged and fine-tuned their own local models-now without knowing the other party's private data set, the shared model is much stronger because the resulting shared model can identify both defect categories (e.g., bridge defects and contact-hole defects). Separately, this federated model provides the capacity to learn what features are unique for each category and identify distinguishing characteristics as well as what features can make these two patterns separable from each other. Furthermore, in various examples, the federated model may be able to incorporate a more wide-ranging set of geometrical features. For example, such a model may be trained to identify defects among many different geometrical and process variables such as vertical and horizontal lines, critical dimension, device pitch, arc length, circle/ellipse, roughness variation, scan direction, illumination, field of view, among other variables.

By increasing the number of clients that contribute to/benefit from this federated model, the global model may become yet further improved with each feedback and global model distribution cycle.

I. Example Federated Machine Learning Frameworks and Methods

Figure 4A:
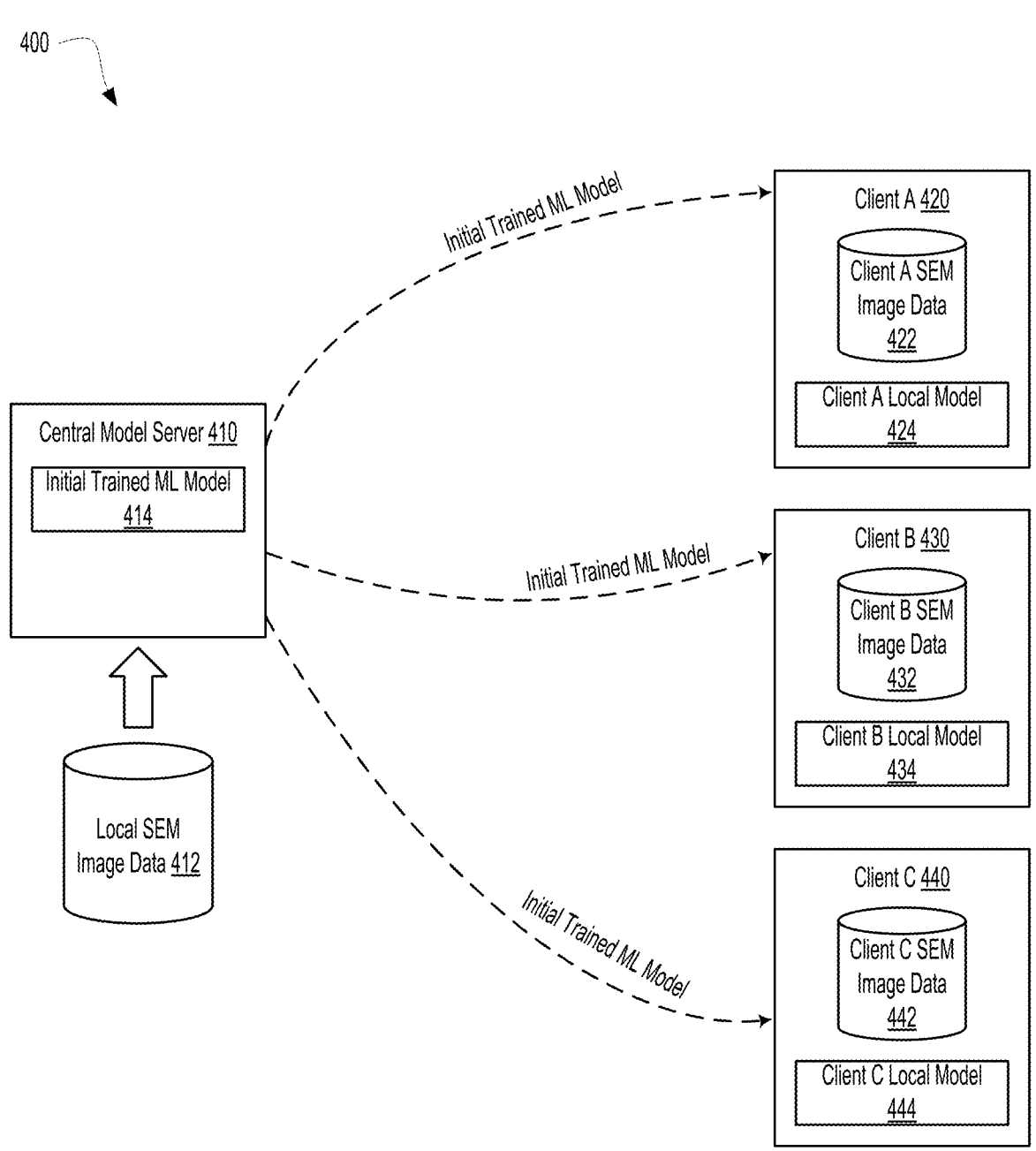
FIG. 4A is an illustration of a federated automatic defect classification (ADC) framework, in accordance with an example embodiment.
Figure 4C:
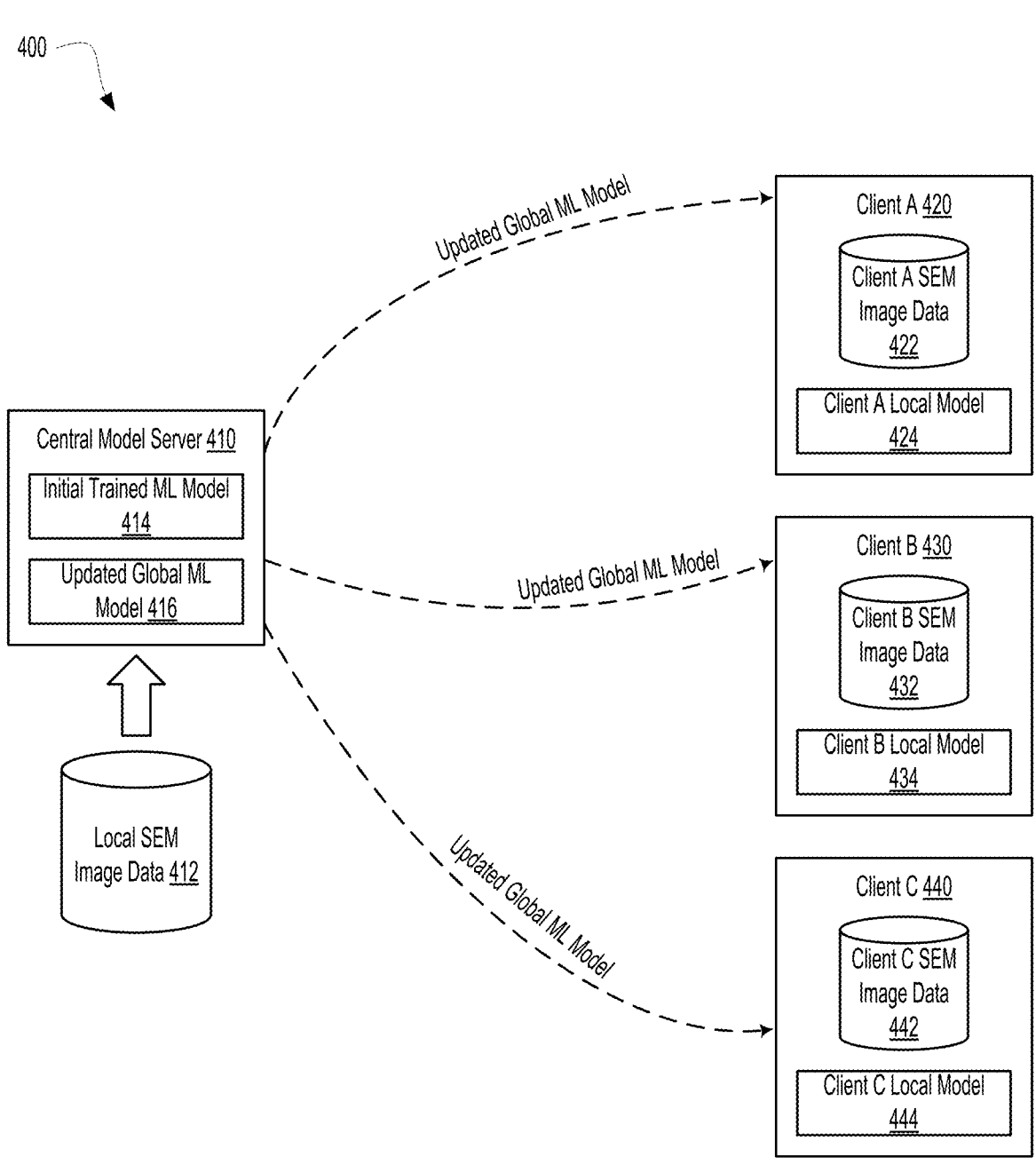
FIG. 4C is an illustration of a federated ADC framework, in accordance with an example embodiment.

FIGS. 4A, 4B, and 4C are illustrations of a federated automatic defect classification (ADC) framework 400, in accordance with an example embodiment. Specifically, the federated ADC framework 400 could include a reinforcement learning (RL)-based method to accurately detect, classify, and localize different defect categories for aggressive pitches and thin resists (e.g., high numerical aperture (NA) applications). In some examples, this framework may beneficially provide unsupervised defect localization and defect feature extraction. Additionally, such a framework and related methods may beneficially mitigate the problem of data privacy between local and global models. Namely, with an RL agent, a universal feature extractor network may be anonymously defined. Additionally or alternatively, defect identification may be performed by a CNN with a one-stage or two-stage detector. A one-stage detector is a model that predicts the bounding boxes and class labels of objects in an image in a single stage. This is done by passing the entire image through the CNN, and then using the output features to predict the bounding boxes and class labels. A two-stage detector, on the other hand, first proposes a set of possible bounding boxes for objects in the image. This is done using a separate model, called a region proposal network (RPN). The proposed bounding boxes are then passed through the CNN, and the CNN is used to refine the bounding boxes and predict the class labels of the objects. Frameworks and methods described herein could also utilize CNN variants such as VggX, GoogleNet, inceptionv3, yolovx, among other possibilities.

As illustrated in FIG. 4A, a central model server 410 may produce and store an initial trained ML model 414 that be trained using local SEM image data 412. After initial training, the trained weight parameters could be provided by a central model server 410 to different clients (e.g., client A 420, client B 430, and client C 440), partners, and/or customers via an encrypted global model. In other words, the initial trained ML model 414 could be provided to the respective clients to seed their respective local models (e.g., client A local model 424, client B local model 434, or client C local model 444). The various clients, partners, and/or customers may use and train the same global model on their own private dataset (e.g., client A SEM image data 422, client B SEM image data 432, or client C SEM image data 442). The respective private datasets are privacy-preserved and cannot be accessed by the central model server 410 or by any other client. In other words, each client, partner, or customer may be configured to collaboratively adjust various aspects of the shared global model on their local server (local model) using their own private dataset. In some embodiments, the central model server 410 could utilize a global feature extractor, which could provide the defect features for which the RL agent may search. Then clients can blindly use this framework for their local dataset. In such scenarios, the global feature extractor may be utilized to extract features from local images and the RL agent could be utilized to search for defects within those features.

Turning to FIG. 4B, each set of trained weight parameters (e.g., Client A trained weight parameters 426, Client B trained weight parameters 436, and Client C trained weight parameters 446) associated with each local encrypted model could be sent back to the central model server 410. In some embodiments, an averaging or consensus/voting strategy 480 could be utilized among the feedback responses to update the global model. The averaging or consensus/voting strategy 480 is described below in reference to method 500.

In such scenarios, the central model server 410 could utilize the received trained weight parameters to form an updated global ML model 416. In some embodiments, the updated global ML model 416 could be beneficially improved by training from a broad range of client process tools, process variables, and SEM inspection tools. Accordingly, in such scenarios, the updated global ML model 416 could provide defect identification, classification, and localization in a more accurate manner.

In various embodiments, the updated global ML model 416 may be released to the clients/vendors/partners periodically and/or iteratively for their local ADC use. This process may recur on a periodic or as-needed basis so as to regularly update client models and obtain updated trained weight parameters from clients with which to update the global model.

In some embodiments, the machine learning process may utilize unsupervised object detection (class-aware/class-agnostic). Unsupervised object detection is a type of object detection that does not require labeled data. In such scenarios, the model does not need to be trained on images that have been manually labeled with the objects in the image. Instead, the model learns to detect objects by looking for patterns in the data. The unsupervised object detection method is described elsewhere herein.

FIG. 5 is a federated machine learning method 500, in accordance with an example embodiment. By way of illustrative examples, reference will be made to various elements of FIGS. 4A, 4B, and 4C to describe the steps or blocks of method 500. Although example embodiments may be described as carrying out certain blocks or steps in a particular order, it will be understood that such blocks or steps may be carried out in a different order. Additionally, steps or blocks could be repeated and/or omitted within the scope of this disclosure.

In reference to FIG. 4A, block 502 of method 500 includes providing, from a central model server (e.g., central model server 410), an initial trained machine learning (ML) model (e.g., initial trained ML model 414) to a plurality of clients (e.g., client A 420, client B 430, and client C 440) as a respective local ML model (e.g., client A local model 424, client B local model 434, and client C local model 444). In such scenarios, the initial trained ML model could be configured to identify defect features from scanning electron microscopy (SEM) images from local SEM image data 412.

As described herein, the SEM images may include semiconductor features such as line-space features, contact hole features, pillar features, logic circuit features, static random access memory (SRAM) features, or dynamic random access memory (DRAM) features. It will be understood that other types of features observable in SEM images and typically observed within the context of semiconductor fabrication are possible and contemplated.

In other words, at least a portion of the SEM images could each include one or more semiconductor defects.

In some examples, the initial trained ML model could be configured to classify defect features from among a plurality of defect categories, wherein the defect categories comprise at least one of: bridge defects, line-collapse defects, gaps/breaks, or micro-bridges. Furthermore, in some embodiments, the initial trained ML model is configured to localize the defect features within a given SEM image frame.

In reference to FIG. 4B, block 504 of method 500 includes receiving, from at least one client by the central model server, information indicative of a respective updated local ML model (e.g., client A trained weight parameters 426, client B trained weight parameters 436, and client C trained weight parameters 446). It will be understood that some or all of the clients may provide the trained weight parameters at any particular point of time. The trained weight parameters could be provided on a prescheduled interval, on an as-needed basis, or on an as-demanded basis.

In example embodiments, receiving the information indicative of a respective updated local ML model by the central model server could include receiving a local encrypted version of the respective updated local ML model.

Block 506 of method 500 includes determining, based on the information indicative of the respective updated local ML models, an updated global ML model (e.g., updated global ML model 416). This determining could be performed by the central model server 410 or another computing device.

In some embodiments, determining the updated global ML model could include incorporating a plurality of adjusted parameter weights from a respective plurality of local ML models based on a consensus/voting process.

In some embodiments, receiving the respective updated local ML model by the central model server does not include receiving local training data from the at least one client. That is, due to the federated structure described herein, the respective client devices do not need to share their respective training data (e.g., the SEM image data) with other parties. Rather, the clients can each locally train a respective local ML model and provide the trained weight parameters from the respective adjusted models to the central model server for potential integration in the updated global ML model.

In various examples, the method 500 also includes further training, at each client, the respective local ML model based on local training data to provide the respective updated local ML model. In some embodiments, training the respective local ML model could include applying a Markov Decision process to the clients' respective local training data so as to accurately classify, detect, and/or localize semiconductor defects. In such scenarios, the local training data includes a plurality of local SEM images. At least a portion of the local SEM images each include one or more semiconductor defects.

In some embodiments, the training of the respective local ML model could include adjusting at least one parameter weight of the respective local ML model.

In various examples, determining the updated global ML model could include incorporating the at least one adjusted parameter weight into the updated global ML model by way of a federated averaging technique. As an example, federated averaging could provide a way to update the global model. As an example, assume that the global model accuracy was 80% before communicating to all clients. In the example, assume 2 clients, a first client with a local trained model accuracy of 85% and a second client with a local trained model accuracy of 70% based on their respective local data.

In such a scenario, the global model may be updated to incorporate the higher accuracy model (e.g., 85%) so as to achieve, in some embodiments, an average overall global accuracy of 82.5. However, conversely, the global model may elect to not incorporate the second client's model parameters because an accuracy average of 70% would not materially improve the global model.

In some examples, this approach may provide an adaptive method to update the global ML model. Deploying an adaptive global model update within the context of a federated machine learning structure involves the process of aggregating and updating the global model while considering the unique characteristics and capabilities of each participating client.

Within the context of the present disclosure, deploying such a federated machine learning structure may include setting up a central server (aggregator) and participating client devices. The method may include initializing the global model on the central server. This could be a pretrained model (e.g., trained on local SEM images) or a randomly initialized one.

In some embodiments, a subset of clients may be selected to participate in each round of model aggregation. The selection can be random, weighted by the availability of data, or based on specific criteria (e.g., SEM hardware, defect feature, process variables, etc.). The initial trained ML model could be transmitted to the selected clients in an encrypted manner. In other words, the initial trained ML model could include an encrypted ML model that is provided to the selected clients.

Each selected client could adjust/train the initial model locally on its own data using techniques like stochastic gradient descent (SGD) or more advanced algorithms. SGD is a type of gradient descent optimization algorithm for minimizing an objective function. It is an iterative algorithm that works by repeatedly updating the parameters of a model in the direction of the negative gradient of the objective function. The gradient of the objective function is a vector that points in the direction of steepest ascent of the function. The negative gradient points in the direction of steepest descent. By repeatedly updating the parameters in the direction of the negative gradient, SGD can eventually find a local minimum of the objective function so as to converge to a best fit solution to the defect recognition problem. In some embodiments described herein, respective clients can additionally or alternatively apply adaptive learning techniques like personalized learning rates or data augmentation, based on their local data characteristics.

After local training, each client may generate an updated model. These updated models will likely include different improvements and changes based on characteristics of their respective local data distribution.

In some embodiments, the federated ML method may aggregate the models by collecting the respective updated models from all participating clients. In such scenarios, the updated models can be transmitted back to the central model server. Thereafter, the central model server may aggregate these updated client models to form a new global model. This aggregation can be performed using methods like federated averaging, where the updates are averaged, and possibly weighted by the number of samples (e.g., SEM images) that each client processed.

In various examples, an adaptive aggregation mechanism may be applied to give more weight to clients with higher accuracy or more reliable data quality. This may beneficially provide that the improvements from clients with better updates are more heavily incorporated into the global model. The adaptive aspect of the aggregation process beneficially provides that the global model can incorporate the diversity of data across clients while accommodating their unique characteristics.

The federated ML method may include replacing the old global model on the central model server with the newly aggregated model (e.g., updated global ML model 416). This updated global model will serve as the starting point for the next iteration of federated learning. That is, the method may include providing the updated global ML model to the plurality of clients as a respective new encrypted local ML model.

Within the scope of the present method, the process may be repeated for multiple rounds of training, each time optionally selecting a new subset of clients and aggregating their updates into the evolving global model. During the iteration process, the central model server could be configured to monitor model convergence and periodically or continuously measure validation performance to decide when to stop the training process.

In various examples, to ensure secure communication between clients and the central server, the exchanged models and/or trained weight parameters could be encrypted or utilize other privacy-preserving techniques to protect sensitive data. In some embodiments, differential privacy (DP) mechanisms could be provided to prevent the extraction of individual client data from the aggregated updates.

In various embodiments, DP mechanisms may include a mathematical framework for ensuring the privacy of individuals when their data is collected and used. It is a statistical notion of privacy that formalizes the idea that an individual's (or a client's) privacy should not be significantly harmed by their participation in a data collection or analysis process.

DP guarantees that an adversary cannot learn much about any individual client's data, even if they have access to the outputs of many different queries on the data. The amount of information that an adversary can learn is limited by a privacy parameter, E. A smaller e value implies stronger privacy guarantees.

In some examples, Secure Aggregation (SecAgg) may be used to ensure private client data is maintained confidentially. SecAgg is a class of Secure Multi-Party Computation algorithms wherein a group of mutually distrustful parties $u \in U$ each hold a private value $x\_u$ and collaborate to compute an aggregate value, such as the $sum\_\{u \in U\} \ x\_u$, without revealing to one another any information about their private value except what is learnable from the aggregate value itself. In such scenarios, SecAgg may be utilized to protect the privacy of each user's model gradient.

In various examples, the central model server could be configured to evaluate the performance of the final global model on a separate validation or test dataset. When the updated global model's performance meets or surpasses a qualification threshold, it may be deployed for inference on new client data.

FIG. 6 is a federated machine learning method 600, in accordance with an example embodiment. By way of illustrative examples, reference will be made to various elements of FIGS. 4A, 4B, and 4C to describe the steps or blocks of method 600. Although example embodiments may be described as carrying out certain blocks or steps in a particular order, it will be understood that such blocks or steps may be carried out in a different order. Additionally, steps or blocks could be repeated and/or omitted within the scope of this disclosure.

Block 602 includes training, based on an initial training dataset (e.g., local SEM image data 412), a machine learning (ML) model to form an initial trained ML model (e.g., initial trained ML model 414). In such scenarios, the initial training dataset a plurality of scanning electron microscopy (SEM) images. As an example, the SEM images could each include semiconductor features. The initial trained ML model is configured to identify, classify, and localize defect features from among the semiconductor features in the SEM images.

As described herein, the semiconductor features could include at least one of: line-space features, contact hole features, pillar features, logic circuit features, static random access memory (SRAM) features, or dynamic random access memory (DRAM) features. Furthermore, the defect features could include at least one of: bridge defects, line-collapse defects, gaps/breaks, or micro-bridges. It will be understood that the ML models described herein could be configured to not be bound to previously defined defect classes. Furthermore, in some examples, the ML models need not classify identified defects at all.

Block 604 includes providing, from a central model server (e.g., central model server 410), the initial trained machine learning model to a plurality of clients (e.g., Client A 420, Client B 430, and Client C 440) as a respective local ML model.

Block 606 includes training, at each of the plurality of clients, the respective local ML model based on a respective client training dataset (e.g., client A SEM image data 422, client B SEM image data 432, and client C SEM image data 442) to form a respective updated local ML model (e.g., client A local model 424, client B local model 434, and client C local model 444). In such scenarios, the respective client training dataset corresponds to a plurality of SEM images of semiconductor defect features specific to that client. As part of the process, the respective updated local ML model includes a respective set of updated weight parameters.

Block 608 includes providing, to the central model server from one or more clients, the respective set of updated weight parameters. In some embodiments, the updated weight parameters could be provided in an encoded or encrypted manner so as to obfuscate the underlying training data used to update the weight parameters. Namely, providing the respective set of updated weight parameters to the central model server could include not providing the respective client training datasets.

Block 610 includes determining, based on the respective set of updated weight parameters, an updated global ML model (e.g., updated global ML model 416).

Method 600 may also include providing the updated global ML model to the plurality of clients as a respective new local ML model.

FIG. 7 is a method 700, in accordance with an example embodiment. In various embodiments, method 700 may include the runtime or inference operations that may be performed by a trained ML model (e.g., updated global ML model 416, client A local model 424, client B local model 434, or client C local model 444). By way of illustrative examples, reference will be made to various elements of FIGS. 4A, 4B, and 4C to describe the steps or blocks of method 700. Although example embodiments may be described as carrying out certain blocks or steps in a particular order, it will be understood that such blocks or steps may be carried out in a different order. Additionally, steps or blocks could be repeated and/or omitted within the scope of this disclosure.

Block 702 includes receiving a scanning electron microscope (SEM) image of a plurality of semiconductor features. Within the scope of the present disclosure, the SEM image could be obtained by a SEM inspection device at a respective client location.

Block 704 includes applying a trained global machine learning (ML) model to determine whether a defect feature exists within the SEM image. The trained global ML model was trained based on incorporating a plurality of adjusted parameter weights from a respective plurality of local ML models operating on a respective client devices based on a consensus/voting process and without receiving local training data from the client devices. In such scenarios, determining whether a defect feature exists in the SEM image could be performed by a computing device located at the given client.

In various example embodiments, the method 700 includes classifying the defect feature into a defect category from a plurality of defect categories. In such scenarios, the plurality of defect categories comprise at least one of: bridge defects, line-collapse defects, gaps/breaks, or micro-bridges.

II. Example Architectures and Methods for Training Machine Learning Models via Reinforcement Learning In described embodiments, the SEM image defect classification/detection/localization problem has been considered as a Markov Decision Process (MDP) within a federated ML framework to model a decision-making agent. A MDP is a mathematical framework for modeling decision-making problems under uncertainty. It is a discrete-time stochastic process, which means that it is defined by a set of states, a set of actions, a transition probability function, and a reward function.

The states of an MDP represent the possible situations that the decision-maker can be in. The actions represent the possible choices that the decision-maker can make. The transition probability function gives the probability of transitioning from one state to another after taking an action. The reward function gives the reward that the decision-maker receives for transitioning from one state to another after taking an action.

The goal of an MDP is to find a policy, which is a function that maps from states to actions. The policy tells the decision-maker what action to take in a given state. The optimal policy is the policy that maximizes the expected reward over time.

As applied to object recognition and localization within SEM imagery, each SEM image is considered as an individual environment, where the agent uses a set of predetermined actions (shift right, shift left, move up/down, scale up/down, change aspect ratio, terminate etc.) to land an appropriate bounding-box for a target defect class (like, line-collapse, bridge, thin bridge etc.).

The agent has a state representation with information of the currently visible region and past actions and receives positive and negative rewards for each decision made during the training phase. In this manner, the agent learns localization policy.

Figure 8:
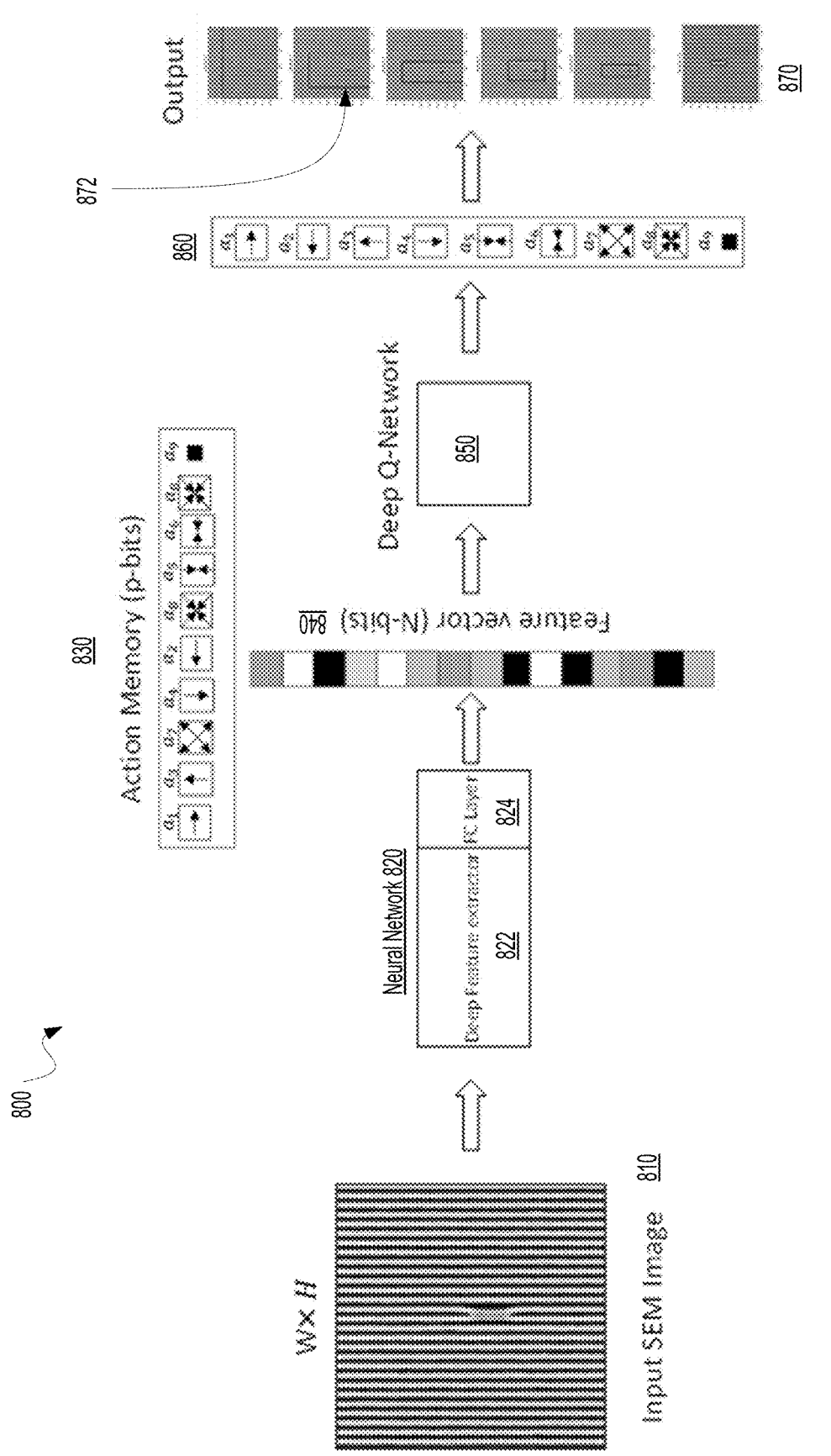
FIG. 8 is an illustration of a reinforcement learning architecture for the classification/detection/localization task, in accordance with an example embodiment.

FIG. 8 is an illustration of a reinforcement learning architecture 800 for the classification/detection/localization task, in accordance with an example embodiment. In an example embodiment, the reinforcement learning architecture 800 may include an input SEM image 810. The reinforcement learning architecture 800 may also include a neural network 820, which could be a convolutional neural network (CNN) or a transformer, such as Swin Transformer. In some examples, the neural network 820 may include a deep feature extractor 822 and a fully connected (FC) layer 824.

In some embodiments, the deep feature extractor 822 could include a type of neural network that is used to extract features from data. The deep feature extractor 822 could include a stack of convolutional layers, followed by one or more fully connected layers. The convolutional layers of the deep feature extractor 822 could be responsible for extracting low-level features from the data, such as edges and corners.

In some examples, the FC layer 824 could include a layer in CNN 820 that connects all neurons in one layer to all neurons in the next layer. In such scenarios, the FC layer 824 could be utilized as a final layer of the network, after the convolutional layers have extracted features from the input image. In various embodiments, the FC layer 824 could be configured to learn higher-level features, such as objects and concepts.

In various examples, the reinforcement learning architecture 800 could include an action memory 830, which could include a history of the actions (e.g., displacements, changes in bounding box size, etc.) previously applied for the given input SEM image 810.

In some scenarios, the reinforcement learning architecture 800 includes a feature vector 840. The feature vector 840 can be used to represent the data in a way that is understandable by the machine learning algorithm. The algorithm can then use the feature vector to learn how to make predictions about the data. Specifically, feature vector 840 could describe features of an image such as pixel values, edges, and shapes.

The reinforcement learning architecture 800 includes a deep Q-network (DQN) 850. The DQN 850 is a type of artificial neural network that is used for reinforcement learning. It is a deep learning model that learns to predict the optimal action to take in a given state, based on the rewards that have been received in the past. DQNs can be utilized to solve Markov decision problems (MDPs), which are problems where the state of the environment evolves over time and the agent must take actions to maximize its long-term reward.

DQNs are trained using a technique called Q-learning. Q-learning is an iterative algorithm that updates the Q-values, which are estimates of the expected reward for taking a given action in a given state. The Q-values are updated using the Bellman equation, which is a mathematical equation that describes how the value of a state-action pair changes over time.

The reinforcement learning architecture 800 includes a transform vector 860. The transform vector may include various transformations or triggers that may define or adjust a bounding box 872 applied to the SEM image 810. In some embodiments, bounding box 872 could be defined as a learnable region. In such scenarios, a precise extent of the bounding box could be decided by the agent in an unsupervised learning session that preserves the learned features helpful for accurate localization, detection, and/or classification. Various methods herein may include a supervised method to optimize a loss function between a ground truth bounding box and a predicted bounding box. Additionally or alternatively, the reinforcement learning architecture 800 could include an unsupervised learning process where the agent is learning about normal/regular pattern behavior. For example, as the RL agent is scanning entire SEM images, patterns may be found that are more or less regular. In the case of stochastic defect patterns, which are irregular from those regular patterns, a bounding box may not be needed. In such scenarios, the RL agent can draw/define a virtual bounding box around the maximum extent of that irregular feature.

The reinforcement learning architecture 800 may provide an output 870, which could include an updated bounding box 872 overlaid on the SEM image 810.

FIG. 9 is a method 900, in accordance with an example embodiment. In particular, method 900 may relate to a reinforcement learning machine learning method. By way of illustrative examples, reference will be made to various elements of FIGS. 4A, 4B, 4C, and/or 8 to describe the steps or blocks of method 900. Although example embodiments may be described as carrying out certain blocks or steps in a particular order, it will be understood that such blocks or steps may be carried out in a different order. Additionally, steps or blocks could be repeated and/or omitted within the scope of this disclosure.

Block 902 includes training a local machine learning (ML) model (e.g., initial trained ML model 414, client A local model 424, client B local model 434, or client C local model 444).

The training includes receiving a scanning electron microscope (SEM) image (e.g. SEM image 810) of semiconductor features.

The training also includes determining a location and dimensions of a bounding box (e.g., bounding box 872) within the SEM image. It will be understood that the bounding box may be determined with supervised or unsupervised learning techniques, as described herein. In an example embodiment, a supervised training method could include training the model based on a bounding box loss optimization process. In such scenarios, relevant metrics may include the Intersection over Union (IOU) and a predetermined confidence threshold, which may provide an objective to maximize the area overlap between a predicted bounding box and the actual location of the object in the image. The IoU score is a measure of the overlap between the predicted bounding box and the ground truth bounding box. A high IoU score indicates that the model is good at predicting bounding boxes that accurately match the ground truth bounding boxes. A low IoU score indicates that the model is not very good at predicting bounding boxes.

In some embodiments, an unsupervised training could include a reinforcement learning agent (RL-agent) could provide unsupervised defect feature extraction, which may in turn provide defect detection, classification and localization. The defect feature extractor, which could be based on a CNN, a transformer, and/or an autoencoder, may extract features for both regular defect free backgrounds as well as irregular/stochastic defect patterns. The task of RL-agent may be to find the region where a maximum dissimilarity score occurs and then virtually draw the bounding box around the precise defect location.

The training includes determining, whether a defect feature exists within the bounding box, based on an unsupervised object detection process.

The training also includes, if the defect feature exists within the bounding box, receiving positive rewards.

The training yet further includes, if the defect feature does not exist within the bounding box, receiving negative rewards.

In some embodiments, one or more steps of method 900 (e.g., training the local ML model) could be performed by a reinforcement learning (RL) agent. In such scenarios, the RL agent may include a Deep Q-Network (DQN) (e.g., DQN 850).

In various scenarios, determining the location and the dimensions of the bounding box could include selecting from among a plurality of possible actions to localize the defect feature. In such cases, the plurality of possible actions could include up translation, down translation, right translation, left translation, bigger scale, smaller scale, fatter aspect ratio, thinner aspect ratio, or a trigger action to finalize a localization prediction.

In example embodiments, determining the location and dimensions of the bounding box could include receiving an action history (e.g., action memory 830) of prior bounding boxes applied to the SEM image and determining the location and dimensions of the bounding box to be different from prior bounding boxes.

In some scenarios, determining whether the defect feature exists within the bounding box could include determining flattened, pooled features from portions of the SEM image within the bounding box based on a feature extractor network (e.g., deep feature extractor 822). In such scenarios, the feature extractor network could include at least one of: VGG feature extractor, MobileNetV2, ResNet, ConvNext, SwinV2, or ViT.

In examples, method 900 could include pretraining weights of the feature extractor network based on at least one of: ImageNet 1K weights, MicroNet, COCO, a custom labeled SEM image dataset, or a custom unlabeled SEM image database. In some embodiments, method 900 could be trained from scratch with a large plurality of SEM images (e.g., hundreds, thousands, or millions of images). In such scenarios, training could be initiated using a random weight initialization.

In some embodiments, determining whether the defect feature exists within the bounding box could include determining whether an Intersection-over-Union (IoU) between the bounding box and a predicted feature bounding box is greater than 0.5. Additionally or alternatively, as described elsewhere herein, determining whether the defect feature exists within a particular SEM image could be performed by an unsupervised training process, such as a reinforcement learning agent. In such scenarios, the RL agent could be configured to determine in an unsupervised manner that a defect feature exists in a given SEM image by similarity/dissimilarity to other SEM images.

In various examples, method 900 may also include triggering a trigger action to finalize a localization prediction when the IoU is greater than a predetermined threshold amount. Additionally or alternatively, an unsupervised metric could be utilized to trigger the trigger action. In such scenarios, the RL agent could automatically trigger the trigger action based on a similarity/dissimilarity metric or another type of unsupervised learning metric.

In some embodiments, the local ML model is configured to localize a single defect feature within a single SEM image. However, it will be understood that method 900 could include, upon determining that a first defect feature exists within the bounding box, applying a mask to obfuscate the first defect feature. In such scenarios, the local ML model may be configured to localize multiple defect features within a single SEM image.

Method 900 may additionally or alternatively include iteratively updating the location and dimensions of the bounding box within the SEM until a defect feature is determined. In example embodiments, the dimensions of the final bounding box may provide an exact extent or at least an approximation of a given defect feature. For example, the polygonal bounding box may provide information such as size, shape, aspect ratio, orientation, and/or other geometrical aspects of the defect. Furthermore, method 900 could include stopping the iterative updating after a predetermined threshold number of iterations, and thereafter providing a final localization prediction.

In some examples, training the local ML model could include receiving a plurality of SEM images. As an example, the plurality of SEM images could vary in at least one of: resist profile or resist thickness.

In various embodiments, the training of the local ML model could also include averaging a number of individual SEM images together to form at least one averaged SEM image. As an example, the number of individual SEM images could include one of: 2, 4, 8, 16, 32, or 64. In such scenarios, the training could include applying the bounding box to the averaged SEM image.

Additionally or alternatively, the semiconductor features could include at least one of: line-space features, contact hole features, pillar features, logic circuit features, static random access memory (SRAM) features, or dynamic random access memory (DRAM) features.

In various examples, method 900 could include classifying the defect feature from among a plurality of defect categories. As such, the defect categories could include at least one of: bridge defects, line-collapse defects, gaps/breaks, or micro-bridges.

In some embodiments, method 900 could include adjusting a subsequent location and dimensions of a subsequent bounding box within the SEM image based on the negative rewards or positive rewards received.

As an example, method 900 could include providing a finalized defect feature location and a finalized defect feature category. That is, method 900 could include providing information indicative of a region on the SEM image where the defect is present and/or a classification of the type of defect present in the SEM image.

Yet further, method 900 could include providing a trained ML model to a central model server of a federated machine learning framework, as described herein.

III. Enumerated Example Embodiments

The present disclosure is described in further detail in the following enumerated example embodiments (EEE). These embodiments are not intended to be limiting, and other embodiments may be possible.

EEE 1 is a federated machine learning method comprising:

providing, from a central model server, an initial trained machine learning (ML) model to a plurality of clients as a respective local ML model, wherein the initial trained ML model is configured to identify defect features from scanning electron microscopy (SEM) images;

receiving, from at least one client by the central model server, information indicative of a respective updated local ML model; and determining, based on the information indicative of the respective updated local ML models, an updated global ML model.

EEE 2 is the federated machine learning method of EEE 1, further comprising training an ML model based on initial training data to form the initial trained ML model, wherein the training data comprises a plurality of SEM images, wherein at least a portion of the SEM images each comprise one or more semiconductor defects.

EEE 3 is the federated machine learning method of EEE 1, wherein receiving the respective updated local ML model by the central model server does not include receiving local training data from the at least one client.

EEE 4 is the federated machine learning method of EEE 1, further comprising further training, at each client, the respective local ML model based on local training data to provide the respective updated local ML model.

EEE 5 is the federated machine learning method of EEE 4, wherein the training the respective local ML model comprises applying a Markov Decision process to the local training data so as to accurately classify, detect, and/or localize semiconductor defects, wherein the local training data comprises a plurality of local SEM images, wherein at least a portion of the local SEM images each comprise one or more semiconductor defects.

EEE 6 is the federated machine learning method of EEE 4, wherein the training of the respective local ML model comprises adjusting at least one parameter weight of the respective local ML model.

EEE 7 is the federated machine learning method of EEE 6, wherein determining the updated global ML model comprises incorporating the at least one adjusted parameter weight into the updated global ML model by way of a federated averaging technique.

EEE 8 is the federated machine learning method of EEE 6, wherein determining the updated global ML model comprises incorporating a plurality of adjusted parameter weights from a respective plurality of local ML models based on a consensus/voting process.

EEE 9 is the federated machine learning method of EEE 1, wherein receiving the information indicative of a respective updated local ML model by the central model server comprises receiving a local encrypted version of the respective updated local ML model.

EEE 10 is the federated machine learning method of EEE 1, wherein the initial trained ML model is configured to classify defect features from among a plurality of defect categories, wherein the defect categories comprise at least one of: bridge defects, line-collapse defects, gaps/breaks, or micro-bridges.

EEE 11 is the federated machine learning method of EEE 1, wherein the SEM images comprise semiconductor features, wherein the semiconductor features comprise at least one of: line-space features, contact hole features, pillar features, logic circuit features, static random access memory (SRAM) features, or dynamic random access memory (DRAM) features.

EEE 12 is the federated machine learning method of EEE 1, wherein the initial trained ML model is configured to localize the defect features within a given SEM image frame.

EEE 13 is the federated machine learning method of EEE 1, wherein the initial trained ML model comprises an encrypted ML model.

EEE 14 is the federated machine learning method of EEE 1, further comprising:

providing the updated global ML model to the plurality of clients as a respective new encrypted local ML model.

EEE 15 is a federated machine learning method comprising:

training, based on an initial training dataset, a machine learning (ML) model to form an initial trained ML model, wherein the initial training dataset comprises a plurality of scanning electron microscopy (SEM) images, wherein the SEM images each comprise semiconductor features, wherein the initial trained ML model is configured to identify, classify, and localize defect features from among the semiconductor features in the SEM images;

providing, from a central model server, the initial trained machine learning model to a plurality of clients as a respective local ML model;

training, at each of the plurality of clients, the respective local ML model based on a respective client training dataset to form a respective updated local ML model, wherein the respective client training dataset corresponds to a plurality of SEM images of semiconductor defect features specific to that client, wherein the respective updated local ML model comprises a respective set of updated weight parameters;

providing, to a central model server from one or more clients, the respective set of updated weight parameters; and determining, based on the respective set of updated weight parameters, an updated global ML model.

EEE 16 is the federated machine learning method of EEE 15, further comprising:

providing the updated global ML model to the plurality of clients as a respective new local ML model.

EEE 17 is the federated machine learning method of EEE 15, wherein providing the respective set of updated weight parameters to the central model server comprises not providing the respective client training dataset.

EEE 18 includes the federated machine learning method of EEE 15, wherein the semiconductor features comprise at least one of: line-space features, contact hole features, pillar features, logic circuit features, static random access memory (SRAM) features, or dynamic random access memory (DRAM) features, and wherein the defect features comprise at least one of: bridge defects, line-collapse defects, gaps/breaks, or micro-bridges.

EEE 19 includes a method comprising:

receiving a scanning electron microscope (SEM) image of a plurality of semiconductor features; and applying a trained global machine learning (ML) model to determine whether a defect feature exists within the SEM image, wherein the trained global ML model was trained based on incorporating a plurality of adjusted parameter weights from a respective plurality of local ML models operating on a respective client devices based on a consensus/voting process and without receiving local training data from the client devices.

EEE 20 includes the method of EEE 19, further comprising: classifying the defect feature into a defect category from a plurality of defect categories, wherein the plurality of defect categories comprise at least one of: bridge defects, line-collapse defects, gaps/breaks, or micro-bridges.

EEE 21 is a method comprising:

training a local machine learning (ML) model, wherein the training comprises:

receiving a scanning electron microscope (SEM) image of semiconductor features;

determining a location and dimensions of a bounding box within the SEM image;

determining, whether a defect feature exists within the bounding box, based on an unsupervised object detection process;

if the defect feature exists within the bounding box, receiving positive rewards; and if the defect feature does not exist within the bounding box, receiving negative rewards.

EEE 22 is the method of EEE 21, wherein one or more steps of training the local ML model are performed by a reinforcement learning (RL) agent.

EEE 23 is the method of EEE 22, wherein the RL agent comprises a Deep Q-Network (DQN).

EEE 24 is the method of EEE 21, wherein determining the location and the dimensions of the bounding box comprises:

selecting from among a plurality of possible actions to localize the defect feature, wherein the plurality of possible actions comprises: up translation, down translation, right translation, left translation, bigger scale, smaller scale, fatter aspect ratio, thinner aspect ratio, or a trigger action to finalize a localization prediction.

EEE 25 is the method of EEE 21, wherein determining the location and dimensions of the bounding box comprises receiving an action history of prior bounding boxes applied to the SEM image and determining the location and dimensions of the bounding box to be different from prior bounding boxes.

EEE 26 is the method of EEE 21, wherein determining whether the defect feature exists within the bounding box comprises:

determining flattened, pooled features from portions of the SEM image within the bounding box based on a feature extractor network.

EEE 27 is the method of EEE 26, wherein the feature extractor network comprises at least one of: VGG feature extractor, MobileNetV2, ResNet, ConvNext, SwinV2, or ViT.

EEE 28 is the method of EEE 26, further comprising:

pretraining weights of the feature extractor network based on at least one of: ImageNet 1K weights, MicroNet, or ImageNet.

EEE 29 is the method of EEE 21, wherein determining whether the defect feature exists within the bounding box comprises:

determining whether an Intersection-over-Union (IoU) between the bounding box and a predicted feature bounding box is greater than 0.5.

EEE 30 is the method of EEE 29, further comprising triggering a trigger action to finalize a localization prediction when the IoU is greater than a predetermined threshold amount.

EEE 31 is the method of EEE 21, wherein the local ML model is configured to localize a single defect feature within a single SEM image.

EEE 32 is the method of EEE 21, further comprising:

upon determining that a first defect feature exists within the bounding box, applying a mask to obfuscate the first defect feature, wherein the local ML model is configured to localize multiple defect features within a single SEM image.

EEE 33 is the method of EEE 21, further comprising:

iteratively updating the location and dimensions of the bounding box within the SEM until a defect feature is determined;

stopping the iterative updating after a predetermined threshold number of iterations; and providing a final localization prediction.

EEE 34 is the method of EEE 21, wherein training the local ML model comprises receiving a plurality of SEM images, wherein the plurality of SEM images vary in at least one of: resist profile or resist thickness.

EEE 35 is the method of EEE 21, wherein the training the local ML model further comprises:

averaging a number of individual SEM images together to form at least one averaged SEM image, wherein the number of individual SEM images comprises one of: 2, 4, 8, 16, 32, or 64; and applying the bounding box to the averaged SEM image.

EEE 36 is the method of EEE 21, wherein the semiconductor features comprise at least one of: line-space features, contact hole features, pillar features, logic circuit features, static random access memory (SRAM) features, or dynamic random access memory (DRAM) features.

EEE 37 is the method of EEE 21, further comprising:

classifying the defect feature from among a plurality of defect categories, wherein the defect categories comprise at least one of: bridge defects, line-collapse defects, gaps/breaks, or micro-bridges.

EEE 38 is the method of EEE 21, further comprising adjusting a subsequent location and dimensions of a subsequent bounding box within the SEM image based on the negative rewards or positive rewards received.

EEE 39 is the method of EEE 21, further comprising: providing a finalized defect feature location and a finalized defect feature category.

EEE 40 is the method of EEE 21, further comprising providing a trained ML model to a central model server of a federated machine learning framework.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method comprising:

training a local machine learning (ML) model, wherein the training comprises:

receiving a plurality of scanning electron microscope (SEM) images, wherein the plurality of SEM images vary in at least one of: resist profile or resist thickness; and for each SEM image of the plurality of SEM images:

determining a location and dimensions of a bounding box within the respective SEM image;

determining, whether a defect feature exists within the bounding box, based on an unsupervised object detection process;

if the defect feature exists within the bounding box, receiving positive rewards; and if the defect feature does not exist within the bounding box, receiving negative rewards.

2. The method of claim 1, wherein one or more steps of training the local ML model are performed by a reinforcement learning (RL) agent.

3. The method of claim 2, wherein the RL agent comprises a Deep Q-Network (DQN).

4. The method of claim 1, wherein determining the location and the dimensions of the bounding box comprises:

selecting from among a plurality of possible actions to localize the defect feature, wherein the plurality of possible actions comprises: up translation, down translation, right translation, left translation, bigger scale, smaller scale, fatter aspect ratio, thinner aspect ratio, or a trigger action to finalize a localization prediction.

5. The method of claim 1, wherein determining the location and dimensions of the bounding box comprises receiving an action history of prior bounding boxes applied to the respective SEM image and determining the location and dimensions of the bounding box to be different from prior bounding boxes.

6. The method of claim 1, wherein determining whether the defect feature exists within the bounding box comprises:

determining flattened, pooled features from portions of the respective SEM image within the bounding box based on a feature extractor network.

7. The method of claim 6, wherein the feature extractor network comprises at least one of: VGG feature extractor, MobileNetV2, ResNet, ConvNext, SwinV2, or ViT.

8. The method of claim 6, further comprising:

pretraining weights of the feature extractor network based on at least one of: ImageNet 1K weights, MicroNet, COCO, a custom labeled SEM image dataset, or a custom unlabeled SEM image dataset.

9. The method of claim 1, wherein determining whether the defect feature exists within the bounding box comprises:

determining whether an Intersection-over-Union (IoU) between the bounding box and a predicted feature bounding box is greater than 0.5.

10. The method of claim 9, further comprising triggering a trigger action to finalize a localization prediction when the IoU is greater than a predetermined threshold amount.

11. The method of claim 1, wherein the local ML model is configured to localize a single defect feature within a single SEM image.

12. The method of claim 1, further comprising:

upon determining that a first defect feature exists within the bounding box, applying a mask to obfuscate the first defect feature, wherein the local ML model is configured to localize multiple defect features within a single SEM image.

13. The method of claim 1, further comprising:

iteratively updating the location and dimensions of the bounding box within the respective SEM image until a defect feature is determined;

stopping the iterative updating after a predetermined threshold number of iterations; and providing a final localization prediction.

14. The method of claim 1, wherein the training the local ML model further comprises:

averaging a number of individual SEM images together to form at least one averaged SEM image, wherein the number of individual SEM images comprises one of: 2, 4, 8, 16, 32, or 64; and applying the bounding box to the averaged SEM image.

15. The method of claim 1, wherein the semiconductor features comprise at least one of: line-space features, contact hole features, pillar features, logic circuit features, static random access memory (SRAM) features, or dynamic random access memory (DRAM) features.

16. The method of claim 1, further comprising:

classifying the defect feature from among a plurality of defect categories, wherein the defect categories comprise at least one of: bridge defects, line-collapse defects, gaps/breaks, or micro-bridges.

17. The method of claim 1, further comprising adjusting a subsequent location and dimensions of a subsequent bounding box within the respective SEM image based on the negative rewards or positive rewards received.

18. The method of claim 1, further comprising: providing a finalized defect feature location and a finalized defect feature category.

19. The method of claim 1, further comprising providing a trained ML model to a central model server of a federated machine learning framework.

\* \* \* \* \*